(12) United States Patent
Alonso et al.

(10) Patent No.: US 6,533,010 B1
(45) Date of Patent: Mar. 18, 2003

(54) AIR REGULATING SYSTEM FOR WHEELS

(76) Inventors: Nelson Alonso, 6320 SW. 93rd Ct., Miami, FL (US) 33173; Norberto Granda, 4628 SW. 10 St., Miami, FL (US) 33134

( * ) Notice: Subject to any disclaimer, the term of this patent is extended or adjusted under 35 U.S.C. 154(b) by 107 days.

(21) Appl. No.: 09/922,565

(22) Filed: Aug. 3, 2001

(51) Int. Cl.[7] .............................................. B60C 23/10
(52) U.S. Cl. ..................................... 152/419; 152/415
(58) Field of Search .............................. 152/415, 418, 152/419, 427, 428, 429

(56) References Cited

U.S. PATENT DOCUMENTS

| | | | | |
|---|---|---|---|---|
| 2,408,126 A | * | 9/1946 | Schole | 152/419 |
| 2,512,766 A | * | 6/1950 | Caldwell | 152/419 |
| 2,626,650 A | * | 1/1953 | Gibbons et al. | 152/419 |
| 2,719,560 A | * | 10/1955 | Caldwell | 152/419 |
| 3,327,755 A | * | 6/1967 | Parr | 152/419 |
| 4,840,212 A | * | 6/1989 | Wei | 152/419 |
| 4,922,984 A | * | 5/1990 | Dosjoub et al. | 152/415 |
| 5,325,902 A | * | 7/1994 | Loewe | 152/419 |
| 5,505,080 A | * | 4/1996 | McGhee | 152/419 |
| 5,556,489 A |   | 9/1996 | Curlett et al. | 152/418 |
| 5,975,174 A | * | 11/1999 | Loewe | 152/415 |

FOREIGN PATENT DOCUMENTS

DE           3607369 A1 * 10/1987 ................. 152/419

* cited by examiner

*Primary Examiner*—S. Joseph Morano
*Assistant Examiner*—Long Bao Nguyen
(74) *Attorney, Agent, or Firm*—J. Sanchelina; A. Bordas

(57) ABSTRACT

An air pressure regulating system mounted within a wheel and tire assembly. It primarily includes a temperature sensor and a compressor assembly having a compression chamber and valves. Utilizing centrifugal forces from the rotation of a wheel and tire assembly, air may flow into and out of a tire to automatically maintain the pressure inside a tire relatively constant over a given temperature range. When the pressurized air in the compression chamber is greater than the pressurized air in the tire, the pressurized air in compression chamber flows into the tire. When the pressurized air in the tire is greater than the pressurized air in the compression chamber, the pressurized air in the tire flows into the compression chamber. When the pressurized air in the compression chamber is equal to the pressurized air in the tire, it is in equilibrium, and no air flow occurs. Ambient air flows into and out of the compression chamber through a valve with means to prevent fluids, such as water, from entering the compression chamber.

12 Claims, 4 Drawing Sheets

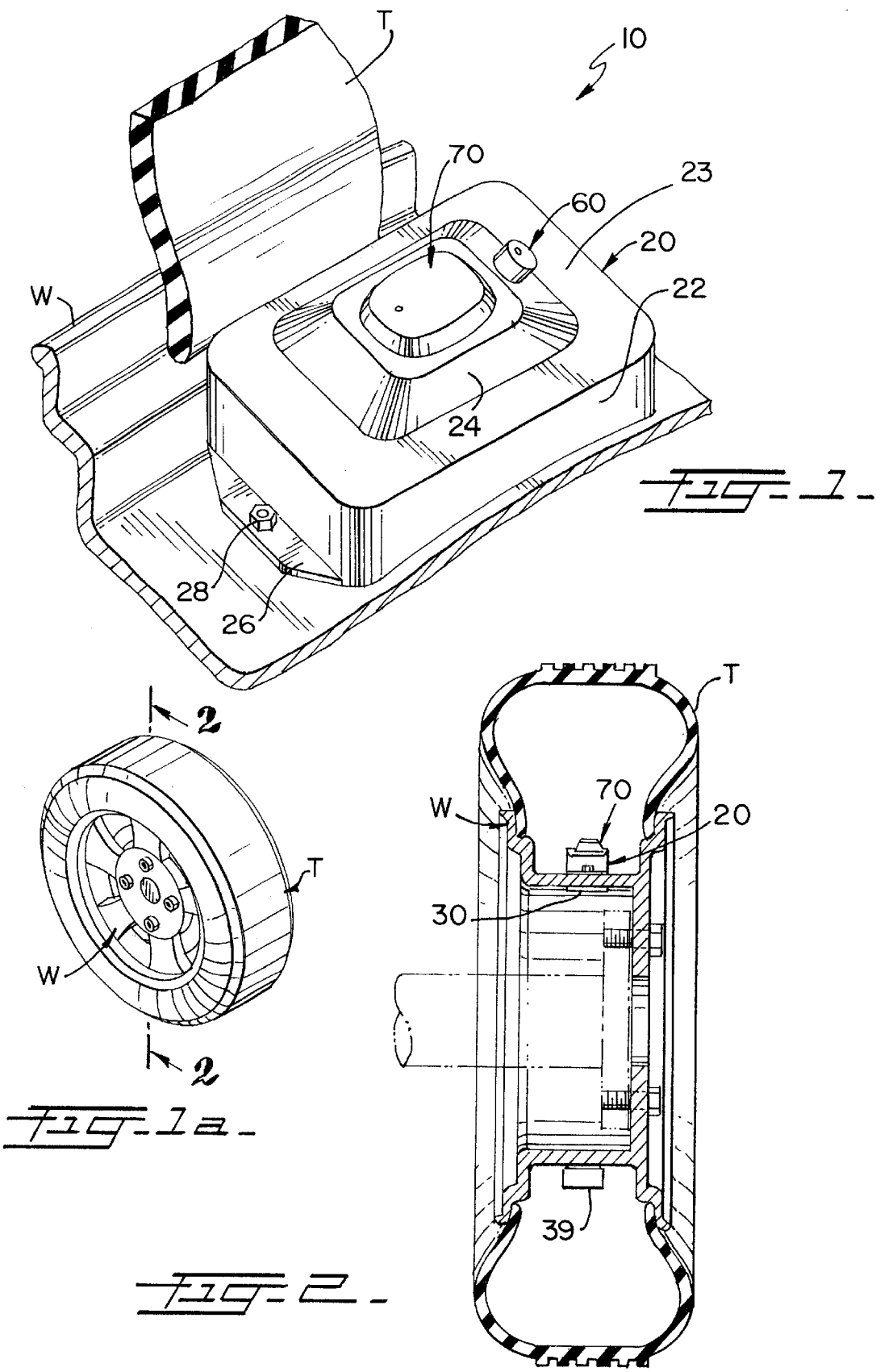

AIR REGULATING SYSTEM FOR WHEELS

BACKGROUND OF THE INVENTION

1. Field of the Invention

The present invention relates to a wheel system to regulate tire pressure, and more particularly, to an air regulating system for wheels incorporating a temperature sensor and a compressor assembly to maintain a predetermined tire air pressure.

2. Description of the Related Art

Many designs for air pressure systems have been designed in the past. None of them, however, include an air system designed to increase and decrease air pressure automatically to a predetermined air pressure while compensating for temperature changes within a tire cavity.

Applicant believes that the closest reference corresponds to U.S. Pat. No. 5,556,489 issued to Curlett, et al for a wheel-mounted tire inflator. The wheel-mounted tire inflator teaches the maintenance of pressure within a vehicle wheel tire to a pre-set level with the air supply being produced by a pump which is driven by centrifugal force, i.e., the wheel rotation creates a centrifugal force which activates a weight to move a piston which pumps the tire inlet air. The pump can be mounted outside or inside the tire volume. Another pump uses the impetus from bumps encountered by the wheel to drive the pump. However, this prior art does not teach a mechanism for decreasing air pressure of a vehicle wheel tire.

Other patents describing the closest subject matter provide for a number of more or less complicated features that fail to solve the problem in an efficient and economical way. None of these patents suggest the novel features of the present invention.

SUMMARY OF THE INVENTION

The present invention provides for a compressor mechanism that automatically maintains the pressure inside a tire relatively constant over a given temperature range.

The present invention is an air regulating system to maintain a predetermined air pressure for a tire in a wheel assembly. It comprises a compressor assembly with first and second ends, said first end perpendicularly and radially mounted within a wheel assembly. The compressor assembly has a weight therein below a diaphragm and it is cooperatively shaped to travel within said compressor assembly. The weight is biased against said first end by an operating spring. The operating spring is fixedly secured beneath the diaphragm to the weight. The compressor assembly is operated by centrifugal forces, which cause the weight to move radially outwardly and by the operating spring urging the weight to move radially inward.

The compressor assembly has first regulation means to allow air to flow in or out of said compressor assembly and second regulation means. First regulation means comprise a two-way valve mounted on said wheel assembly, said two way valve in the open position when said weight is biased against the first end. Furthermore, first regulation means comprise an ambient air system with a two-way valve system having a spring biasing a ball against a pin. First regulation means further comprises a passage way strategically placed and shaped within to prevent liquids such as water, that may filtrate, to displace air within said first regulation means.

The second regulation means allow pressurized air to flow between a compression chamber above said diaphragm and the tire. The second regulation means comprises a two-way valve mounted to said housing assembly above said diaphragm to allow for the flow of pressurized air to attain equilibrium between said compression chamber and the tire when said weight is biased towards the second end. The second regulation means comprise a two-way valve system having a spring biasing a ball against a pin.

A temperature sensor is fixedly mounted to the second end and is filled with matter that reacts to fluctuations in temperature. These fluctuations causing said temperature sensor to expand or contract proportionately to a change in said temperature. In an alternate embodiment to the temperature sensor, a pressure sensor can be fixedly mounted to said second end, said pressure sensor having a diaphragm that reacts to fluctuations in tire and compressor pressure causing said diaphragm to flex proportionately to a change in said tire and compressor pressure.

Furthermore, a counterweight is secured to the wheel to compensate for a dynamic imbalance when said tire and said wheel assembly is rotated.

It is therefore one of the main objects of the present invention to provide an apparatus to maintain the pressure inside a tire relatively constant over a given temperature range where pressurized air flows in or out of a tire, based on the direct relationship of a tire temperature and tire pressure.

It is another object of this invention to provide an apparatus to attain and maintain a predetermined air pressure in a tire by using a temperature sensor in cooperation with a compressor assembly.

It is still another object of the present invention to provide an apparatus utilizing energy from a centrifugal force to automatically increase and decrease air pressure within a wheel and tire assembly.

It is another object of this invention to provide an apparatus where the operation of the temperature sensor is based on how the temperature of a tire affects the pressure of the tire.

It is yet another object of this invention to provide an apparatus to maintain the pressure inside a tire relatively constant over a given temperature range without the need of human intervention.

It is yet another object of this invention to provide such a device that achieves a desired predetermined air pressure in cooperation with the temperature of a tire.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents an isometric view of the instant invention mounted on the internal channel face of wheel W.

FIG. 1a represents a perspective view of a wheel and tire assembly.

FIG. 2 shows a cross sectional view of the instant invention within a wheel and tire assembly taken along line 2—2 in FIG. 1a.

DETAILED DESCRIPTION OF THE PREFERRED EMBODIMENT

Figure 3:
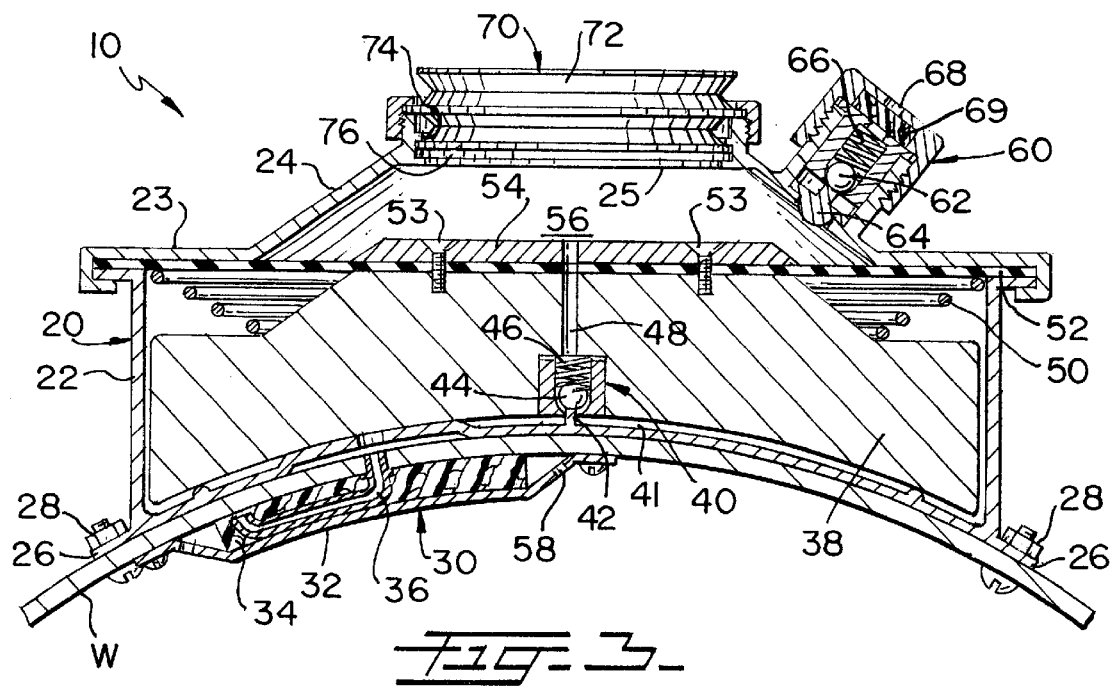
FIG. 3 illustrates an elevational cross-section view of the instant invention and a portion of the wheel assembly when the latter is not rotating and weight 38 is at the minimum separation position.

Referring now to the drawings, where the present invention is generally referred to with numeral 10, it can be observed that it basically includes compressor assembly 20 and temperature sensor 70.

As seen in FIG. 1, instant invention 10 is located inside tire T and is mounted onto an internal channel face of wheel assembly W. Compressor assembly 20 has housing base 22, which is removably secured onto wheel W. Housing base 22 has at least one flange 26 perpendicularly extending to provide surface area for securing it to wheel W. In the preferred embodiment, nut 28 may be utilized for securing. Other forms of securing housing base 22 to wheel W may include welding, rivets, and similar forms of attachment. Extending from housing shoulder 23 is housing neck 24. At one side of housing neck 24 is pressure valve 60. Mounted on and connecting to the top of housing neck 24 is temperature sensor 70. Temperature sensor 70 is an accordion like structure, expanding and contracting with changes in temperature to a wheel and tire assembly.

Seen in FIG. 1a is tire T mounted onto wheel W.

As seen in FIG. 2, instant invention 10 has counter-weight 39 to offset the weight of compressor assembly 20 and temperature sensor 70. Counter-weight 39 serves to balance the wheel and tire assembly, thus allowing for proper rotation. Additionally, counter-weight 39 may be removably secured to wheel W with nut and bolt assemblies, rivets, or similar forms of attachment.

As seen in FIG. 3, instant invention 10 has weight 38 in the minimum separation position. In the minimum separation position, ambient air may flow into or out of compression chamber 56 through ambient air valve 40. Compressor assembly 20 primarily comprises ambient air system 30, ambient air valve 40, and pressure valve 60. When the ambient air pressure is greater than the air pressure within compression chamber 56, ambient air enters instant invention 10 through ambient air system 30. Ambient air system 30 includes housing 32 mounted onto wheel W. Ambient air enters housing 32 through at least one through-hole 58. Filter 34 within housing 32 prevents foreign matter such as dust and dirt from entering ambient air system 30. Ambient air flows through passage way 36 to chamber 41, below weight 38. Passage way 36 is strategically placed and shaped within housing 32 to prevent liquids such as water, that may filtrate into housing 32, to displace air inside passage way 36. This prevents water from entering chamber 41. Any water that may enter housing 32 will be disposed of, through through-hole 58 by centrifugal forces once the wheel and tire assembly begin rotation.

Centrally positioned in the preferred embodiment, ambient air valve 40 is secured within weight 38. Ambient air valve 40 comprises ball 44, which is biased by spring 46. Protruding perpendicularly and towards ball 44 is pin 42. Ambient air may flow through ambient air valve 40 when ball 44 makes contact with pin 42. Passageway 48 longitudely extends from ambient air valve 40 to compression chamber 56 for air to flow through.

When wheel W is idle, weight 38 is kept at a position identified as minimum separation. Weight 38 is kept at the minimum separation position by operating spring 50. Operating spring 50 is fixedly secured to weight 38.

Figure 4:
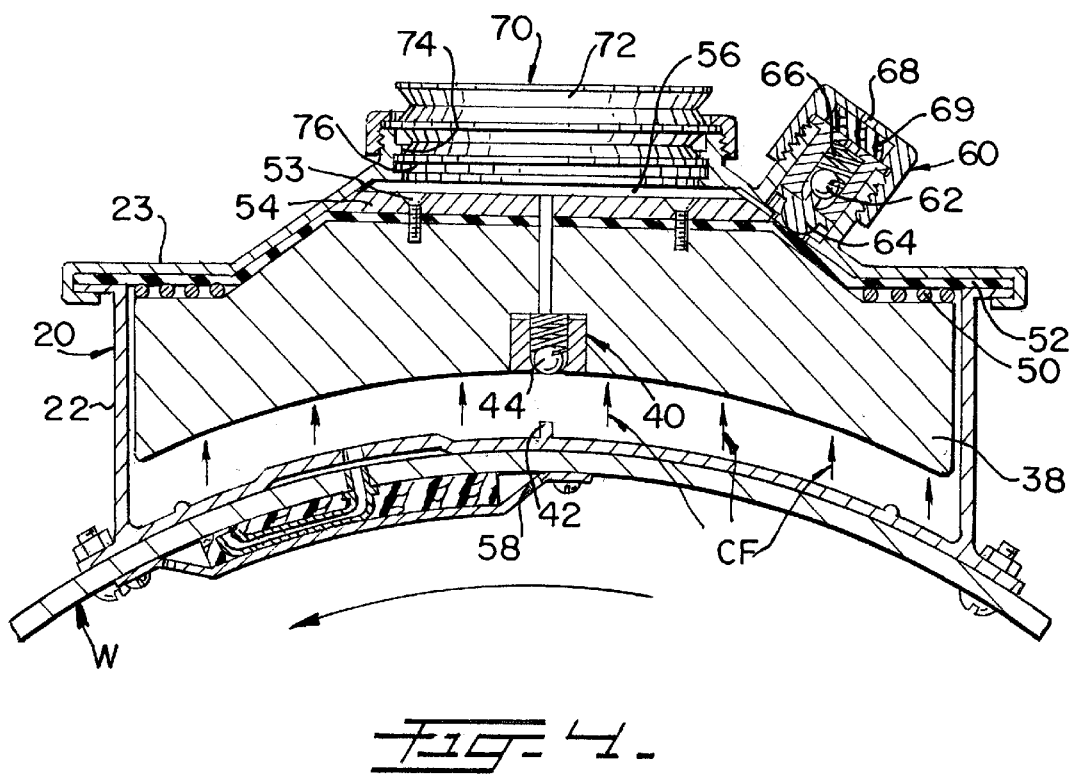
FIG. 4 is a representation of an elevational cross-section view of the instant invention when the wheel assembly is rotating and weight 38 has achieved the maximum separation position.

As seen in FIG. 4, when wheel W begins to rotate and increases in revolutions per minute, weight 38 is forced from the minimum separation position by centrifugal force CF, created by the rotation of wheel W. Ambient air valve 40 is closed with ball 44 when instant invention 10 is not in the minimum separation position. Snugly fitted above weight 38 is diaphragm 52. Diaphragm 52 keeps pressure chamber 56 airtight and is secured between head 54 and weight 38 with bolts 53. For additional stability, diaphragm 52 may be secured in between housing shoulder 23 and housing base 22. As weight 38 moves from the minimum separation position towards the maximum separation position, it compresses the air within compression chamber 56 to a predetermined air pressure. The predetermined air pressure is achieved by temperature sensor 70. As temperature sensor 70 expands and contracts, it changes the volume in compression chamber 56, resulting in the predetermined compression ratio.

Temperature sensor 70 comprises accordion chamber 72. Top ring 74 and bottom ring 76 serve to establish the expansion limit for accordion chamber 72. The top portion of accordion chamber 72 is designed to allow for additional expansion in the event necessary if the bottom portion of accordion chamber 72 has fully expanded to the designed limit.

The expansion and contraction of temperature sensor 70 achieve predetermined air pressure. Because the compression ratio changes in compression chamber 56, a predetermined maximum and minimum compression pressure is observed, as to not over or under inflate tire T, seen in FIG. 2. Temperature sensor 70 hermetically house matter such as a liquid, which expands or contracts, based on temperature changes. Just like the air pressure of tire T is directly affected by changes in temperature, temperature sensor 70 is directly affected by temperature changes, at which an expansion or contraction changes the volume within and thus the compression ratio within compression chamber 56. The incorporation of temperature sensor 70 with compressor assembly 20 allows for a predetermined air pressure to be realized by pumping air under pressure into or out of tire T in direct relationship to temperature.

In this embodiment, temperature sensor 70 is manufactured to operate from 28 to 36 pounds per square inch with relation to the temperature range of 30 to 120 degrees Fahrenheit. An equilibrium line determines the air pressure that is pumped into or out of the tire.

Other embodiments of temperature sensor 70 may be manufactured for various other pressure to temperature relations as required by the wheel and tire assembly and the environment it is utilized in.

pressure valve 60 allows pressurized air to flow from compression chamber 56 into tire T and vice versa. Pressure valve 60 comprises ball 62 biased by spring 66 against actuating pin 64. Pressurized air flows through passage way 68. Filter 69 prevents foreign matter from contaminating the air flowing through.

In the maximum separation position, weight 38 has overcome the spring force of operating spring 50. In this position, weight 38 has made contact with actuating pin 64. This contact opens pressure valve 60 and creates the connection between compression chamber 56 and the pressurized air within tire T, seen in FIG. 2, via passage way 68.

In this position, one of three actions occurs:
A) when the pressurized air in compression chamber 56 is greater than the pressurized air in tire T, the pressurized air in compression chamber 56 flows into tire T, as shown in chart 1 as PUMP IN;
B) when the pressurized air in tire T is greater than the pressurized air in compression chamber 56, the pressurized air in tire T flows into compression chamber 56, as shown in chart 1 as PUMP OUT;
C) when the pressurized air in compression chamber 56 is equal to the pressurized air in tire T, it is in equilibrium, and no air flow occurs, as shown in chart 1 as the equilibrium line.

When wheel W reduces rotational speed and becomes idle, centrifugal force CF ceases. The spring force of operating spring 50 overcomes centrifugal force CF as seen in FIG. 3. Additionally, since weight 38 no longer is in contact with actuating pin 64, spring 66 biases ball 62 to close pressure valve 60. In the minimum separation position, seen in FIG. 3, ball 44 makes contact with pin 42, thus opening ambient air valve 40. Ambient air valve 40 comprises ball 44 biased by spring 46 and passage way 48. Ambient air valve 40 allows air to flow from compression chamber 56 to chamber 41 and out through passage way 36 when it has excessive air pressure, or from chamber 41 to compression chamber 56.

Figure 5:
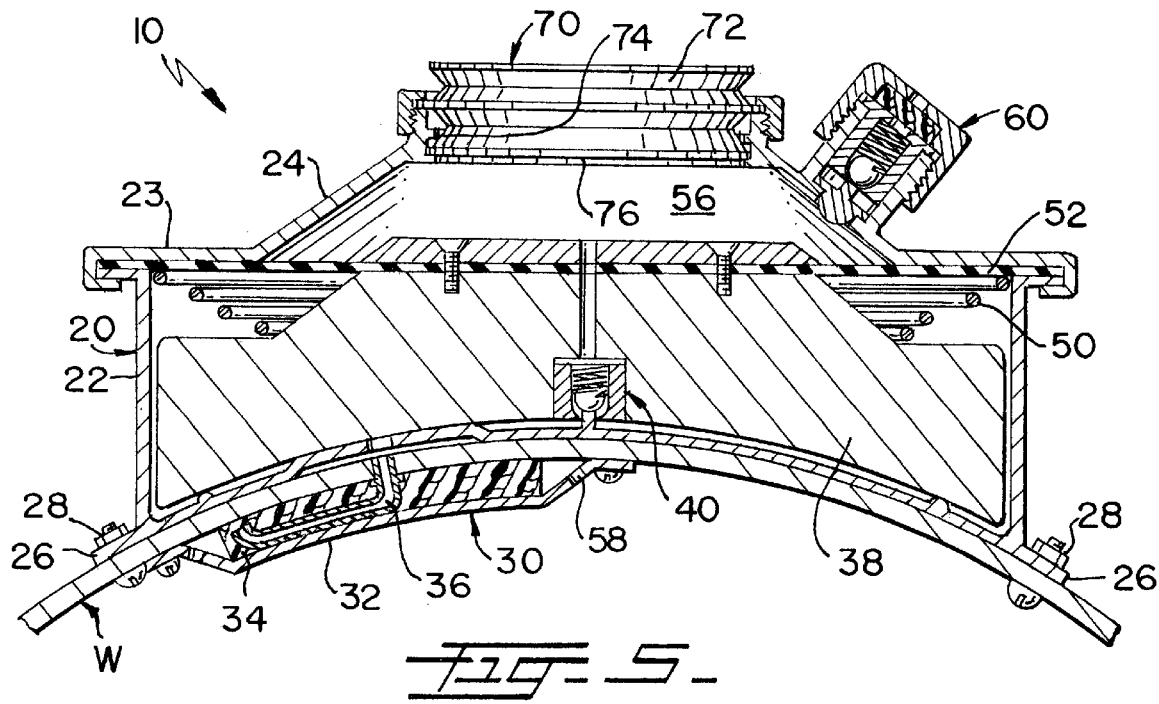
FIG. 5 illustrates an elevational cross-section view of the instant invention when the temperature sensor has achieved maximum expansion and when the wheel assembly is not rotating and weight 38 is at the minimum separation position.

As seen in FIG. 5, instant invention 10 is in the minimum separation position and temperature sensor 70 has achieved maximum expansion. The position shown is caused by the effect of temperature on temperature sensor 70.

Figure 6:
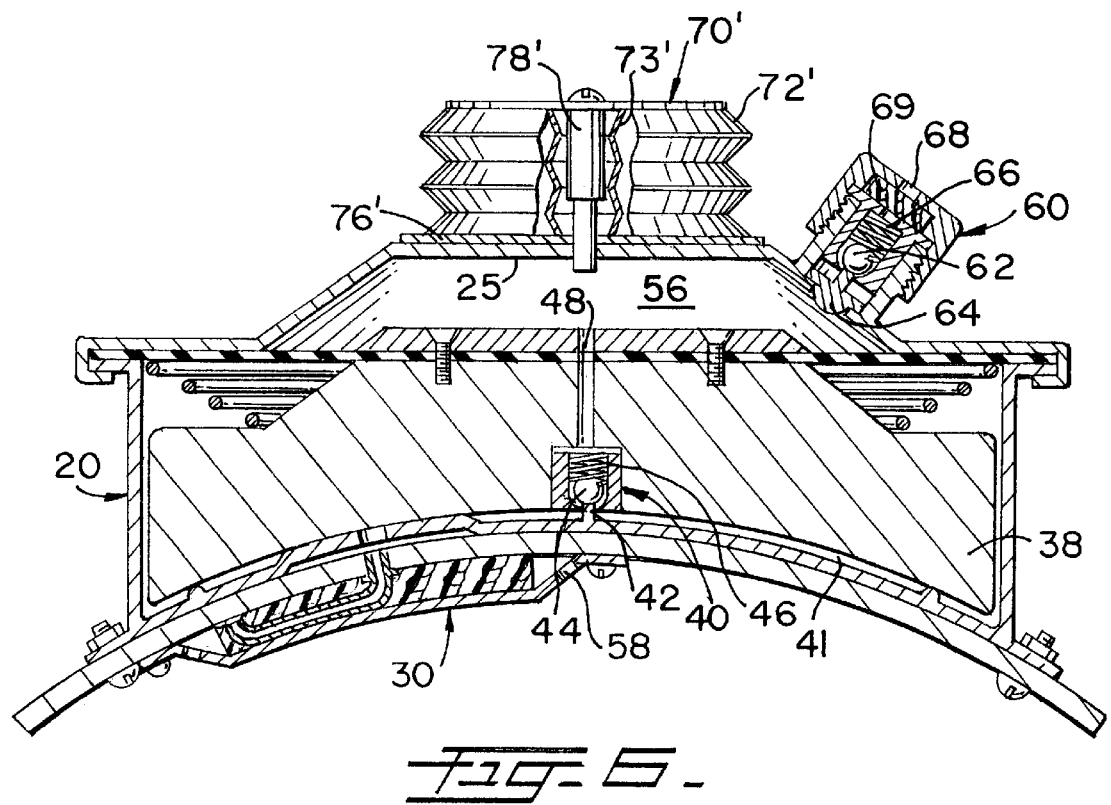
FIG. 6 illustrates an elevational cross-section view of the instant invention with an alternate temperature sensor and when the wheel assembly is not rotating and weight 38 is at the minimum separation position.

Seen in FIG. 6 is an alternate embodiment for the temperature sensor, depicted as temperature sensor 70'. Temperature sensor 70' is an accordion type with pin 78' longitudinally trespassing therethrough, comprising accordion chamber 72' and interior accordion chamber 73'. Between accordion chamber 72' and interior accordion chamber 73' is a matter that reacts to fluctuations in temperature causing temperature sensor 70' to expand or contract. Bottom ring 76' is secured to housing face 25. Changes in temperature cause the expansion and contraction of accordion chamber 72' and interior accordion chamber 73', which cause pin 78' to travel in a downward or upward direction. The position of pin 78' establishes the compression ratio by limiting the range of motion of weight 38.

Figure 7:
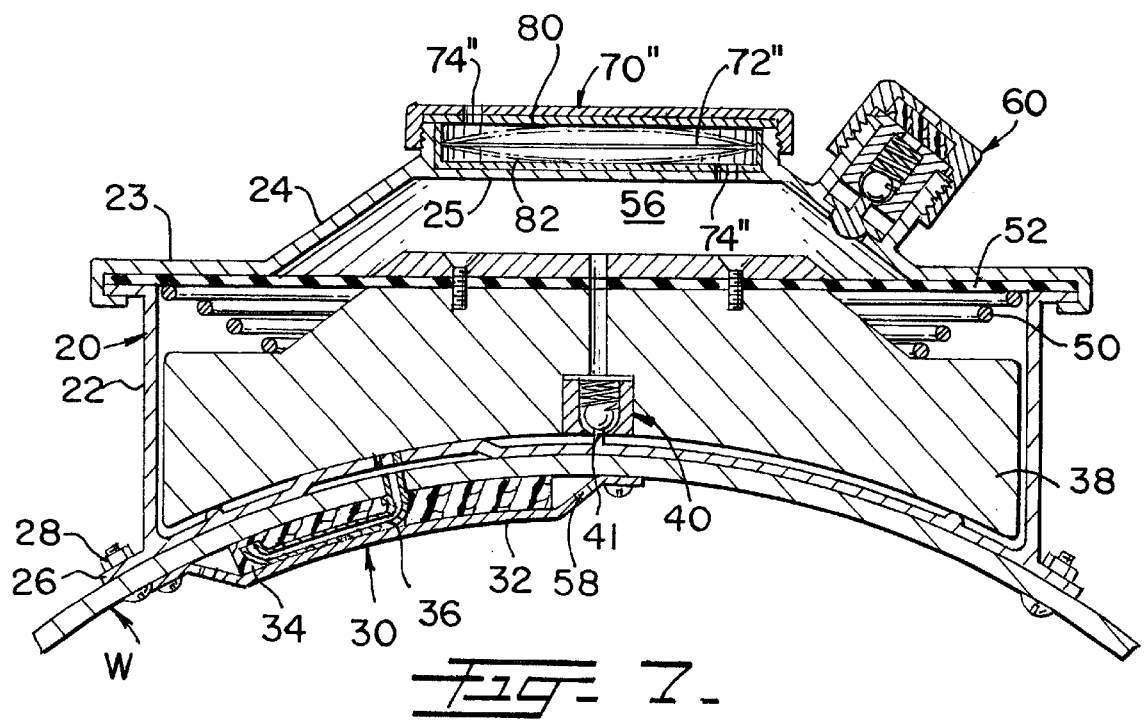
FIG. 7 illustrates an elevational cross-section view of the instant invention with a pressure sensor as an alternate to the temperature sensor and when the wheel assembly is not rotating and weight 38 is at the minimum separation position.

Seen in FIG. 7 is yet another embodiment for the temperature sensor, depicted as pressure sensor 70". Pressure sensor 70" comprises diaphragm 72" and holes 74". The top portion of diaphragm 72" is affected by air pressure within tire T. Diaphragm 80 is the position of diaphragm 72" at the expansion limit, with low tire pressure. The bottom portion of diaphragm 72" regulates the compression pressure, which changes the compression ratio in compression chamber 56. Diaphragm 82 is the position of diaphragm 72" at the expansion limits, with high tire pressure. The expansion limits depicted by diaphragms 80 and 82 are set to allow air to flow into and out of a tire to automatically maintain the pressure inside a tire relatively constant over a given pressure to temperature range.

Figure 7A:
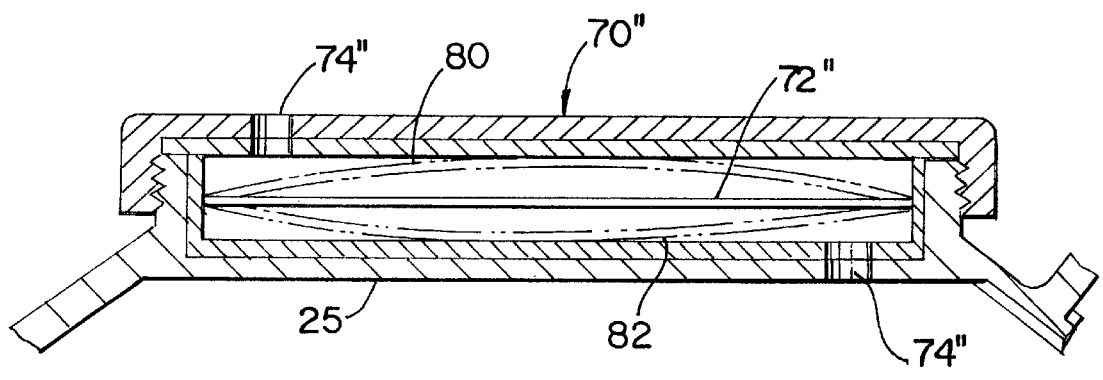
FIG. 7a illustrates a blow up view of the pressure sensor seen in FIG. 7.

As seen in FIG. 7a, the position of diaphragm 80 illustrates when air will pump into a tire, as charted in chart 2, seen below. The position of diaphragm 82 illustrates when air will flow out of a tire, as charted in chart 2. Finally, any position in between diaphragms 80 and 82, as diaphragm 72", depicts the equilibrium zone as seen in chart 2.

CHART 2

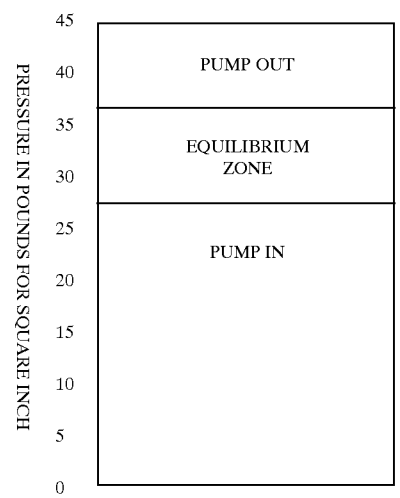

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:
1. An air regulating system to maintain a predetermined air pressure for a tire in a wheel assembly, comprising:
   A) a compressor assembly with first and second ends, said first end perpendicularly and radially mounted within a wheel assembly, said compressor assembly having a weight therein below a diaphragm, said weight cooperatively shaped to travel within said compressor assembly, said weight biased against said first end by an operating spring, said operating spring fixedly secured beneath said diaphragm to said weight, said compressor assembly being operated by a centrifugal force which causes said weight to move radially outwardly and by said operating spring urging said weight to move radially inward, said compressor assembly further having first regulation means to allow air to flow in or out of said compressor assembly and second regulation means to allow pressurized air to flow between a compression chamber above said diaphragm and said tire;
   B) a temperature sensor fixedly mounted to said second end, said temperature sensor filled with matter that reacts to fluctuations in temperature causing said temperature sensor to expand or contract proportionately to a change in said temperature; and C) a counterweight secured to said wheel to compensate for a dynamic imbalance when said tire and said wheel assembly is rotated.

2. The air regulating system to maintain a predetermined air pressure for a tire in a wheel assembly set forth in claim 1, wherein said first regulation means comprises a two-way valve mounted on said wheel assembly, said two way valve in the open position when said weight is biased against said first end.

3. The air regulating system to maintain a predetermined air pressure for a tire in a wheel assembly set forth in claim 2, wherein said second regulation means comprises a two-way valve mounted to said housing assembly above said diaphragm to allow for the flow of pressurized air to attain equilibrium between said compression chamber and said tire when said weight is biased towards said second end.

4. The air regulating system to maintain a predetermined air pressure for a tire in a wheel assembly set forth in claim 3, wherein said first regulation means comprises an ambient air system with a two way valve system comprising a spring biasing a ball against a pin.

5. The air regulating system to maintain a predetermined air pressure for a tire in a wheel assembly set forth in claim 4, wherein said second regulation means comprises a two way valve system comprising a spring biasing a ball against a pin.

6. The air regulating system to maintain a predetermined air pressure for a tire in a wheel assembly set forth in claim 5, wherein said first regulation means further comprises a passage way strategically placed and shaped within to prevent water, that may filtrate, to displace air within said first regulation means.

7. An air regulating system to maintain a predetermined air pressure for a tire in a wheel assembly, comprising:

A) a compressor assembly with first and second ends, said first end perpendicularly and radially mounted within a wheel assembly, said compressor assembly having a weight therein below a diaphragm, said weight cooperatively shaped to travel within said compressor assembly, said weight biased against said first end by an operating spring, said operating spring fixedly secured beneath said diaphragm to said weight, said compressor assembly being operated by a centrifugal force which causes said weight to move radially outwardly and by said operating spring urging said weight to move radially inward, said compressor assembly further having first regulation means to allow air to flow in or out of said compressor assembly and second regulation means to allow pressurized air to flow between a compression chamber above said diaphragm and said tire;

B) a pressure sensor fixedly mounted to said second end, said pressure sensor having a diaphragm that reacts to fluctuations in tire and compressor pressure causing said diaphragm to flex proportionately to a change in said tire and compressor pressure; and C) a counterweight secured to said wheel to compensate for a dynamic imbalance when said tire and said wheel assembly is rotated.

8. The air regulating system to maintain a predetermined air pressure for a tire in a wheel assembly set forth in claim 7, wherein said first regulation means comprises a two-way valve mounted on said wheel assembly, said two way valve in the open position when said weight is biased against said first end.

9. The air regulating system to maintain a predetermined air pressure for a tire in a wheel assembly set forth in claim 8, wherein said second regulation means comprises a two-way valve mounted to said housing assembly above said diaphragm to allow for the flow of pressurized air to attain equilibrium between said compression chamber and said tire when said weight is biased towards said second end.

10. The air regulating system to maintain a predetermined air pressure for a tire in a wheel assembly set forth in claim 9, wherein said first regulation means comprises an ambient air system with a two way valve system comprising a spring biasing a ball against a pin.

11. The air regulating system to maintain a predetermined air pressure for a tire in a wheel assembly set forth in claim 10, wherein said second regulation means comprises a two way valve system comprising a spring biasing a ball against a pin.

12. The air regulating system to maintain a predetermined air pressure for a tire in a wheel assembly set forth in claim 11, wherein said first regulation means further comprises a passage way strategically placed and shaped within to prevent water, that may filtrate, to displace air within said first regulation means.

\* \* \* \* \*